(12) United States Patent
Kim et al.

(10) Patent No.: US 9,398,295 B2
(45) Date of Patent: *Jul. 19, 2016

(54) METHOD AND APPARATUS FOR UNEQUAL ERROR PROTECTION IN TRANSMITTING UNCOMPRESSED VIDEO WITH VARIOUS TYPE OVER WIDEBAND HIGH FREQUENCY WIRELESS SYSTEM

(71) Applicant: Electronics and Telecommunications Research Institute, Daejeon (KR)

(72) Inventors: Yong Sun Kim, Suwon-si (KR); Seung Eun Hong, Daejeon (KR); Kyeongpyo Kim, Daejeon (KR); Hyoung Jin Kwon, Cheongju-si (KR); Jin Kyeong Kim, Daejeon (KR); Woo Yong Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 95 days.

This patent is subject to a terminal disclaimer.

(21) Appl. No.: 13/950,986

(22) Filed: Jul. 25, 2013

(65) Prior Publication Data

US 2013/0308056 A1 Nov. 21, 2013

Related U.S. Application Data

(63) Continuation of application No. 12/406,329, filed on Mar. 18, 2009, now Pat. No. 8,520,726.

(30) Foreign Application Priority Data

Mar. 18, 2008 (KR) .................. 10-2008-0024741
May 2, 2008 (KR) .................. 10-2008-0041165
Dec. 16, 2008 (KR) .................. 10-2008-0127924

(51) Int. Cl.
*H04N 7/26* (2006.01)
*H04N 19/67* (2014.01)

(52) U.S. Cl.
CPC ......... *H04N 19/00866* (2013.01); *H04N 19/67* (2014.11)

(58) Field of Classification Search
CPC ..... H04N 19/182; H04N 19/89; H04N 19/67; H04N 19/37; H04N 19/186; H04N 19/184
See application file for complete search history.

(56) References Cited

U.S. PATENT DOCUMENTS

| 6,223,324 B1 | 4/2001 | Sinha et al. |
| 7,016,658 B2 | 3/2006 | Kim et al. |
| 8,520,726 B2 * | 8/2013 | Kim et al. ............ 375/240 |
| 2007/0189397 A1 | 8/2007 | Ngo et al. |

(Continued)

FOREIGN PATENT DOCUMENTS

| EP | 1479244 B1 | 11/2004 |
| KR | 10-0763207 | 9/2007 |

(Continued)

OTHER PUBLICATIONS

Notice of Allowance mailed Jul. 26, 2013 in corresponding U.S. Appl. No. 12/406,329.

(Continued)

*Primary Examiner* — Albert Decady
*Assistant Examiner* — Kyle Vallecillo
(74) *Attorney, Agent, or Firm* — Staas & Halsey LLP

(57) ABSTRACT

Disclosed are an Unequal Error Protection (UEP) apparatus and method thereof for transmitting various types of uncompressed video signals in a broadband high frequency wireless system. The UEP apparatus may include a UEP transmission controller to verify a bit separation point of separating a color depth and priority for each pixel element being composed of a video data pixel when video data is inputted, and to control an error correction coding of correcting relatively many errors to be used in information with a high priority for each pixel element, a bit separator to separate the video data pixel through a control of the UEP transmission controller based on the priority for each pixel element, and a channel coding unit to use a corresponding error correction coding through the control of the UEP transmission controller based on the priority for each pixel element.

6 Claims, 8 Drawing Sheets

(56) References Cited

U.S. PATENT DOCUMENTS

| | | | |
|---|---|---|---|
| 2007/0198887 A1 | 8/2007 | Reznic et al. | |
| 2007/0223527 A1 | 9/2007 | Shao et al. | |
| 2007/0258651 A1 | 11/2007 | Shin et al. | |
| 2007/0271493 A1 | 11/2007 | Oh et al. | |
| 2007/0286188 A1* | 12/2007 | Fan et al. | 370/389 |
| 2008/0002649 A1* | 1/2008 | Xia et al. | 370/338 |
| 2008/0130741 A1* | 6/2008 | Chiang et al. | 375/240.01 |

FOREIGN PATENT DOCUMENTS

| | | |
|---|---|---|
| KR | 10-2007-0109760 | 11/2007 |
| KR | 10-2007-0117425 | 12/2007 |
| KR | 10-2008-0007055 | 1/2008 |

OTHER PUBLICATIONS

U.S. Appl. No. 12/406,329, filed Mar. 18, 2009, Yong Sun Kim, et al.

Office Action mailed Aug. 2, 2011 in corresponding U.S. Appl. No. 12/406,329.

Office Action mailed Jan. 31, 2012 in corresponding U.S. Appl. No. 12/406,329.

Advisory Action mailed Apr. 12, 2012 in corresponding U.S. Appl. No. 12/406,329.

Notice of Allowance mailed Apr. 26, 2013 in corresponding U.S. Appl. No. 12/406,329.

U.S. Appl. No. 12/406,329, filed Mar. 18, 2009, Yong Sun Kim, et al., Electronics and Telecommunications Research Institute.

* cited by examiner

METHOD AND APPARATUS FOR UNEQUAL ERROR PROTECTION IN TRANSMITTING UNCOMPRESSED VIDEO WITH VARIOUS TYPE OVER WIDEBAND HIGH FREQUENCY WIRELESS SYSTEM

CROSS-REFERENCE TO RELATED APPLICATIONS

This application is a continuation application of U.S. Ser. No. 12/406,329, filed Mar. 18, 2009 now allowed, which claims the benefit of Korean Patent Application Nos. 10-2008-0024741 filed on Mar. 18, 2008, 10-2008-0041165 filed on May 2, 2008 and 10-2008-0127924 filed on Dec. 16, 2008 in the Korean Intellectual Property Office, the disclosures of all of which are incorporated herein by reference.

BACKGROUND

1. Field

Example embodiments of the present disclosure relate to an Unequal Error Protection (UEP) method and apparatus for transmitting various types of uncompressed video signals in a broadband high frequency wireless system, and more particularly, to a UEP method and apparatus for transmitting and receiving various types of uncompressed video signals, which are immune to radio channel errors, according to a priority of the video signals while maintaining a high transmission/reception speed.

2. Description of the Related Art

Unlike general data information in which priorities of all data information bits are the same, video information may have different priorities of video information bits. For example, upper bits of pixel bytes displaying images may be more important than lower bits thereof, and luminance information bits of an image may be more important than chrominance information bits of the image. Also, in an RGB chromatic system being comprised of Red elements, Green elements, and Blue elements, the Green elements are more important.

In general, the video information may be required to be transmitted at a high speed because an amount of the video information is significantly greater than that of the general data information and the video information requires real-time performance in information transmission. In addition, channel errors may occur in a radio channel due to various factors, resulting in transformation of transmitted information. To minimize the transformation of the information due to the radio channel errors, supplementary information (hereinafter, referred to as channel error correction code) may be added to information intended to be transmitted in a transmission terminal, and transformed information may be restored in a reception terminal using the added channel error correction code. However, the channel error correction code information may reduce a transmission speed of a channel.

Concerning the priority of the video information and characteristics of the radio channel, a recent 'high transmission speed radio system through an ultra-wideband high frequency band' may categorize upper bits and lower bits of pixel information bytes being comprised of image information, and use more channel error correction code information in the upper bits and use less channel error correction code information in the lower bits, thereby preventing transformation of important information, and improving image quality. As described above, adapting unequal error correction schemes according to a priority of signals may be referred to as an Unequal Error Protection (UEP) scheme.

FIG. 1 illustrates a UEP scheme of general uncompressed videos according to a conventional invention. In the UEP scheme illustrated in FIG. 1, RGB (Red, Green, and Blue) pixel data each having an 8-bit field may be separated into 4 bits/4 bits, 3 bits/5 bits, and 2 bits/2 bits/4 bits to assign a high priority to upper bits, and thereby the channel error correction code may be unequally assigned.

However, the above-mentioned UEP scheme may display the priority using common bit position of three element information (RGB information or YCbCr information) being comprised of a pixel. Also, according to the above-mentioned UEP scheme, a case where each of the three element information is displayed as identical 8-bits may be considered. That is, since the priority may be classified only using common bit positions of the pixel information, a priority difference between luminance information (corresponding to Y in a YCbCr system) and chrominance information (corresponding to CbCr in the YCbCr system), and a priority difference between Green information and Red/Blue information in the RGB chromatic system may not be used. Also, the above-mentioned UEP scheme may not support pixel information displayed as various depths such as 8-bits/16-bits/32-bits and the like, because the color depth is required to be separated into 8-bits/8-bits when being displayed as 16-bit color space information, however, when the color depth is separated into a 4-bit unit as illustrated in FIG. 2, 4th bit to 7th bit positions may be assigned with more stronger channel error correction codes than in 8th bit to 12th bit positions.

FIG. 2 illustrates an example of errors occurring according to a color depth and bit separation position in a UEP scheme of general videos.

SUMMARY

One or more example embodiments may provide an Unequal Error Protection (UEP) method and apparatus for transmitting various types of uncompressed video signals in a broadband high frequency wireless system.

One or more example embodiments may also provide a method and apparatus which may reflect various bit fields of elements being comprised of a pixel in uncompressed video information, and support a priority difference (Y>Cb or Cr, G>R or B) between components while maintaining, as is, a priority discrimination scheme through an existing bit field separation.

According to example embodiments, an Unequal Error Protection (UEP) transmission apparatus may be provided. The UEP transmission apparatus may include: a UEP transmission controller to verify a bit separation point of separating a color depth and priority for each pixel element being composed of a video data pixel when video data is inputted, and to control an error correction coding of correcting relatively many errors to be used in information with a high priority for each pixel element; a bit separator to separate the video data pixel through a control of the UEP transmission controller based on the priority for each pixel element; and a channel coding unit to use a corresponding error correction coding through the control of the UEP transmission controller based on the priority for each pixel element.

According to other example embodiments, a UEP reception apparatus may be provided. The UEP reception apparatus may include: a UEP reception controller to verify a bit separation point of separating a color depth and priority for each pixel element being composed of a pixel; a demodulation unit to perform a corresponding demodulation according to priority information of UEP video data included in a header of the UEP video data when UEP video data is received; a channel decoding unit to perform an error correction coding, which is separated according to the priority information, on the demodulated data according to the priority information; and a bit combiner to combine, through a control of the UEP reception controller, the data on which the error correction coding is performed according to the priority information based on the color depth and bit separation point.

According to other example embodiments, a UEP method in a transmission apparatus may be provided. The UEP method may include: verifying a bit separation point for separating a bit field size and priority for each pixel element being comprised of a pixel of video data; classifying the pixel of the video data based on the priority for each pixel element; and performing an error correction coding for correcting relatively many errors occurring in information having a high priority for each pixel element.

According to other example embodiments, a UEP method in a reception apparatus may be provided. The UEP method may include: verifying a bit separation point for separating a bit field size and priority for each pixel element being comprised of a pixel; performing a demodulation on UEP video data according to priority information of the UEP video data included in a header of the UEP video data when the UEP video data is received; performing an error correction coding with respect to the UEP video data on which the demodulation is performed according to the priority information, the error correction coding being classified according to the priority information; and combining, for each pixel element, the data on which the error correction coding is performed based on the bit field size and bit separating point.

Additional aspects and/or advantages will be set forth in part in the description which follows and, in part, will be apparent from the description, or may be learned by practice of the example embodiments.

BRIEF DESCRIPTION OF THE DRAWINGS

These and/or other aspects, features, and advantages of example embodiments will become apparent and more readily appreciated from the following description, taken in conjunction with the accompanying drawings of which.

DETAILED DESCRIPTION

Figure 1:
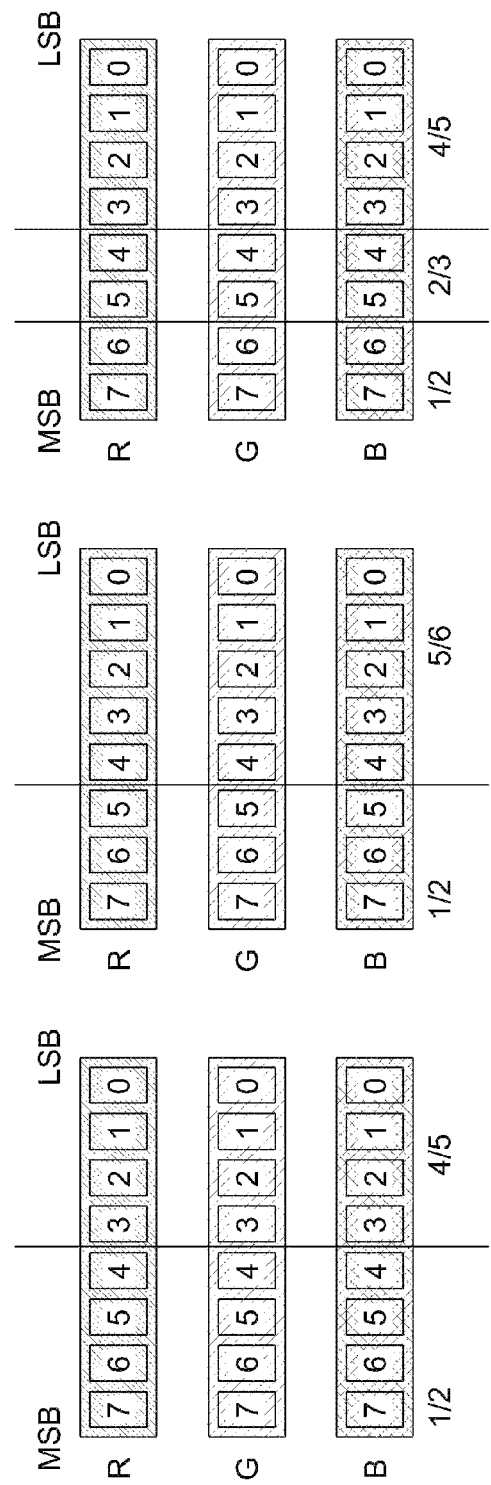
FIG. 1 illustrates an Unequal Error Protection (UEP) scheme of general uncompressed videos according to a conventional invention.
Figure 2:
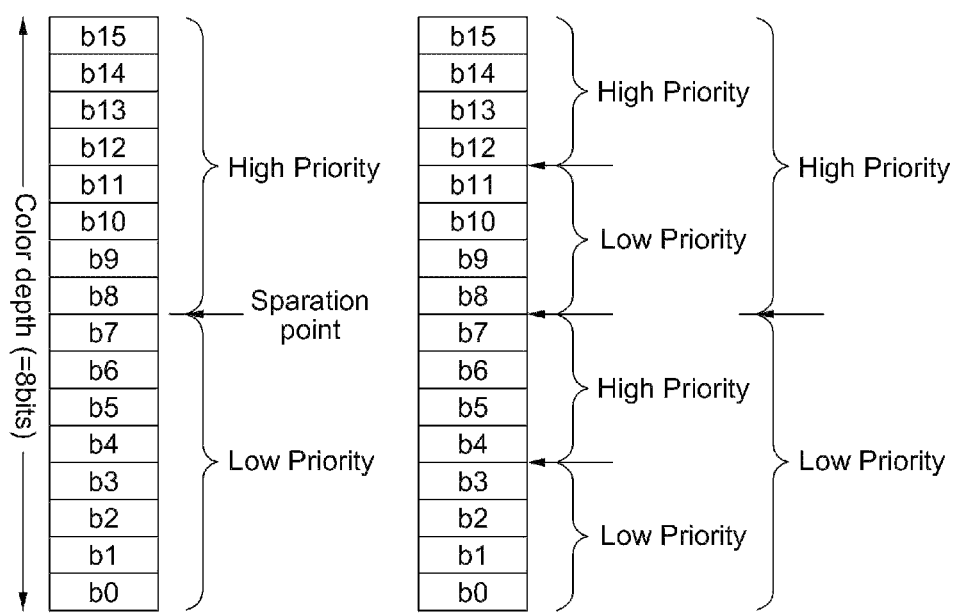
FIG. 2 illustrates an example of errors occurring according to a color depth and bit separation point in a UEP scheme of general videos.

Reference will now be made in detail to example embodiments, examples of which are illustrated in the accompanying drawings, wherein like reference numerals refer to the like elements throughout. Example embodiments are described below to explain the present disclosure by referring to the figures.

The present disclosure relates to an Unequal Error Protection (UEP) method and apparatus for transmitting various types of uncompressed video signals in a broadband high frequency wireless system.

Figure 3:
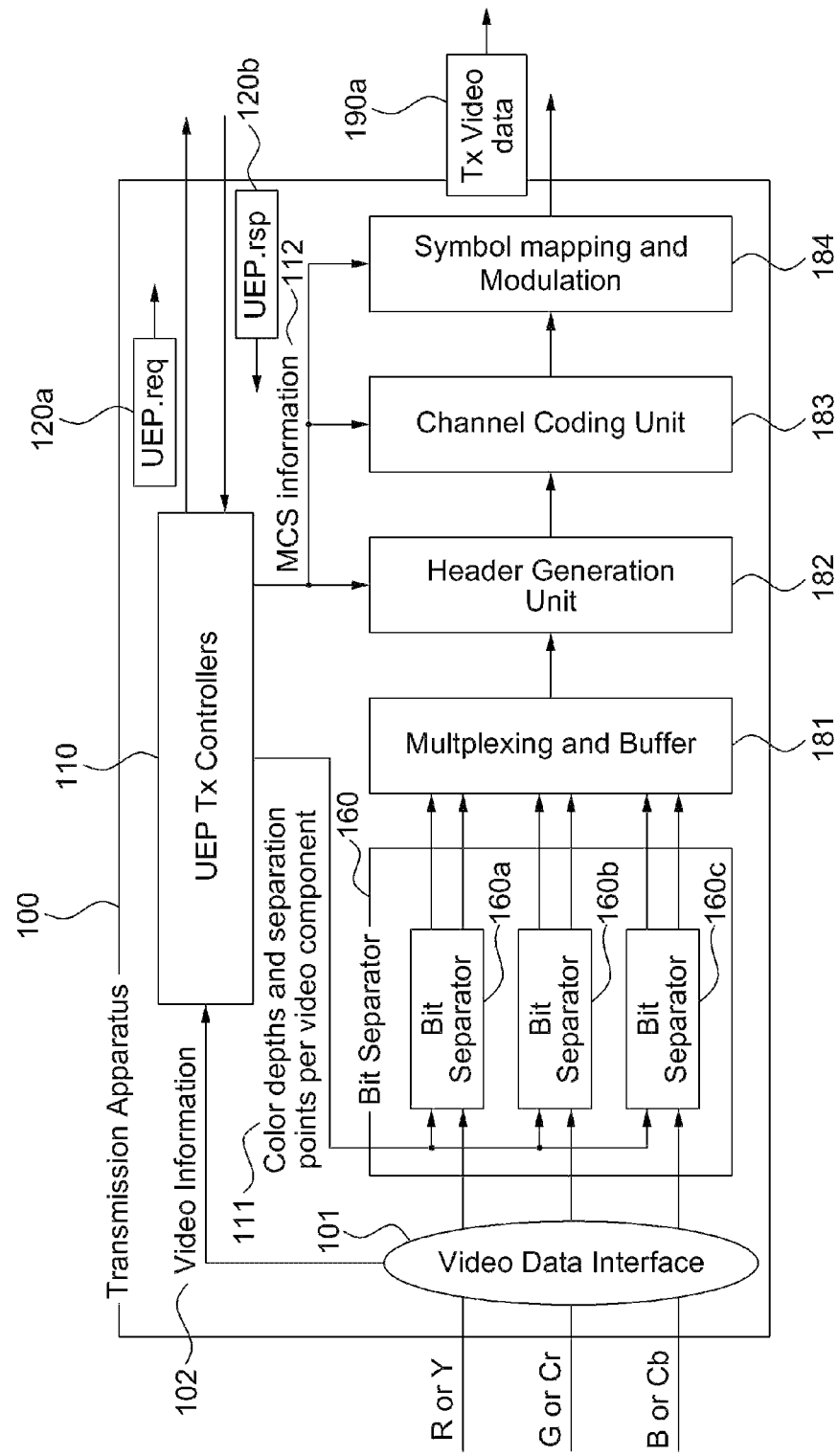
FIG. 3 illustrates a configuration of a UEP transmission apparatus according to example embodiments.

FIG. 3 illustrates a configuration of a UEP transmission apparatus 100 according to example embodiments of the present invention. The UEP transmission apparatus 100 includes: a video data input interface 101 to receive various video signals such as R/G/B (Red/Green/Blue), Y/Cb/Cr, and the like; a UEP transmission controller (hereinafter, referred to as UEP Tx controller) 110 to negotiate a UEP scheme with a reception apparatus and control internal operations of the UEP transmission apparatus 100; a bit separator 160 to include a plurality of bit separators 160a, 160b, and 160c of separating inputted video signals based on a size of a pixel bit field and a bit separation point each provided for each pixel information to thereby configure frames each having a high priority or low priority; a multiplexing and buffer unit 181 to multiplex and store the configured frames; a header generation unit 182 to assign a sequence and priority and recording demodulation and channel decoding information; a channel coding unit 183 to unequally supplement channel error correction information depending on a priority; and a symbol mapping and modulation unit 184 to perform symbol mapping and modulation depending on the priority.

The video data input interface 101 may be an apparatus receiving various types of uncompressed video signals, so while the present specification may describe only R/G/B and Y/Cb/Cr types, other uncompressed video signals may be received.

R/G/B color image may be comprised of pixels constituting Red (R), Green (G), and Blue (B) elements, and Y/Cb/Cr color image may be comprised of pixels constituting a luminance (Y) element and chrominance elements (Cb and Cr).

These pixel elements may be displayed as various color depths such as 8-bits, 16-bits, and the like. The video data input interface 101 may inform the UEP transmission controller 110 of inputted uncompressed video information 102, and transmit, to the video signal bit separator 160, the inputted uncompressed video information 102 for each pixel information.

The UEP Tx controller 110 may receive, from the video data input interface 101, the video information 102 including a pixel type constituting video images, a bit field size of the pixel, a bit separation point of separating a priority of the pixel, and the like, transmit a negotiation request message 120a of the UEP scheme to a UEP reception controller, which will be described in detail below, so as to transmit the corresponding video image in the UEP scheme, and receive a UEP response message 120b with respect to the negotiation request message 120a.

Also, the UEP Tx controller 110 may control a series of procedures associated with video image transmission using UEP information 111 and 112 which are negotiated through an exchange between the messages 120a and 120b. The bit separator 160 may receive, from the video data input interface 101, video data of a series of bit type for each pixel information (R/G/B or Y/Cb/Cr).

The bit separator 160 may receive, from the UEP Tx controller 110, the color depth and bit separation point for each pixel information to configure frames each having a high priority or low priority by separating video data bits inputted for each pixel information in a scheme, which will be described in detail in FIG. 6.

The multiplexing and buffer unit 181 may sequentially multiplex and store the frame with the high priority and the frame with the low priority each being outputted for each pixel information from the bit separator 160, and singly output the multiplexed and stored frames.

The header generation unit 182 may assign a sequence number and a priority (two-level priorities are provided in the present specification, however, multi-level priorities may be provided) to the frames outputted from the multiplexing and buffer unit 181, and may receive demodulation information and channel decoding information that is included in modulation and coding scheme (MCS) information 112 required for receiving the frames from the UEP Tx controller 112 to thereby supplement a header.

The channel coding unit 183 may unequally insert channel error correction information depending on a priority of frame data inputted from the header generation unit 182 using channel coding information included in the MCS information 112 provided from the UEP Tx controller 110. Specifically, greater channel error correction information may be inserted in a case of the frame with a high priority, and less channel error correction information may be inserted or no channel error correction information may be inserted in a case of the frame with a low priority.

The symbol mapping and modulation unit 184 may map, in a symbol, bits of the frame outputted from the channel coding unit 183, and modulate the mapped bits according to a modulation scheme for each frame priority provided from the UEP Tx controller 110 to transmit the modulated bits to the reception apparatus.

Figure 4:
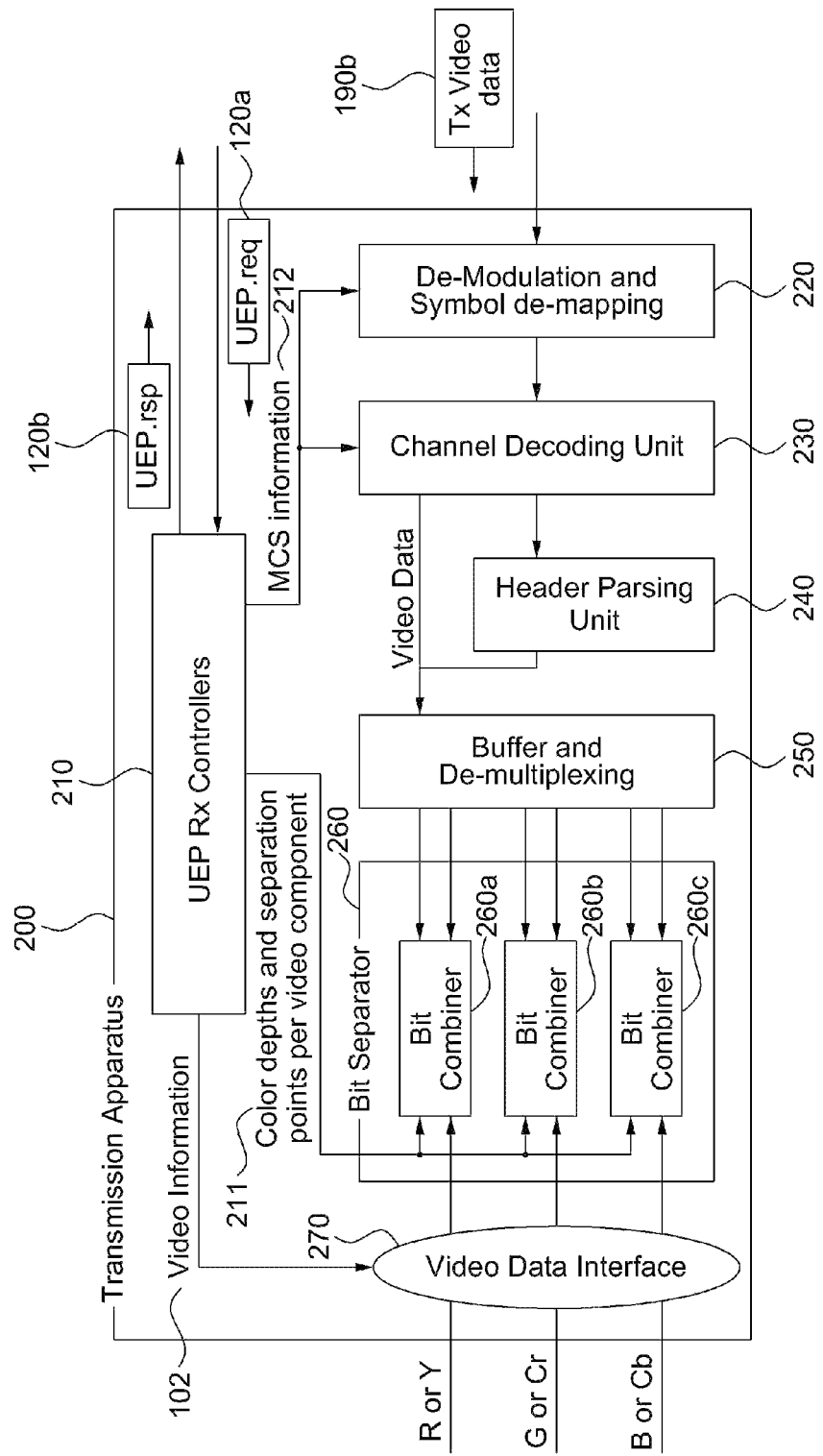
FIG. 4 illustrates a configuration of a UEP reception apparatus according to example embodiments.

FIG. 4 illustrates a configuration of a UEP reception apparatus 200 according to example embodiments of the present invention. The UEP reception apparatus 200 may be comprised of component units being identical to those of the UEP transmission apparatus 100, and an operation procedure of UEP reception apparatus 200 may be performed in a reverse order of that of the UEP transmission apparatus 100.

The UEP reception apparatus 200 includes: a de-modulation and symbol de-mapping device 220 to modulate received radio frequency (RF) signals and extract bit information from a modulated symbol; a channel decoding unit 230 to correct error generation bits from the inserted channel error correction information; a header parsing unit 240 to parse information of a received header and transmit demodulation and channel decoding information of video data and priority and sequencing information received based on the parsed information; a buffer and de-multiplexing unit 250 to store a received video frame and inputting related frame information to a bit combiner 260 depending on the sequencing information and priority information; the bit combiner 260 including a plurality of bit combiners 260a, 260b, and 260c to extract bits for each pixel information from the received video frames; a video data output interface 270; and a UEP receiving controller 210 (hereinafter, referred to as UEP Rx controller).

The UEP Rx controller 210 may receive the negotiation request message 120a of the UEP scheme from the UEP Tx controller 110, and transmit the UEP response message 120b with respect to the negotiation request message 120a. Also, the UEP Rx controller 210 may control a series of procedures associated with receiving a video image using UEP information 211 negotiated through an exchange between the messages 120a and 120b.

The de-modulation and symbol de-mapping device 220, the channel decoding unit 230, and the header parsing unit 240 may receive header information according to a predetermined transmitting/receiving scheme of the header information to sequentially process the received header information. The header parsing unit 240 having parsed the header information may transmit, to the de-modulation and symbol de-mapping device 220 and the channel decoding unit 230, demodulation and channel decoding information of video data signals intended to be received. In this instance, a type of the transmitted information may be MCS index information, which will be described in detail below.

The de-modulation and symbol de-mapping device 220 and the channel decoding unit 230 may appropriately process the received video data signals using the demodulation and channel decoding information transmitted from the header parsing unit 240, and transmit the processed signals to the buffer and de-multiplexing unit 250. In this instance, the header parsing unit 240 may also transmit the sequencing information and priority information obtained from corresponding header information to the buffer and de-multiplexing unit 250.

The buffer and de-multiplexing unit 250 may readily extract a frame with a high priority and a frame with a low priority using the sequencing information and priority information inputted together with the video frame data, and input these frames to the bit combiner 260.

The bit combiner 260 may receive, from the buffer and de-multiplexing unit 250, the frames with high priority and low priority for each pixel information, and also receive, from the UEP Rx controller 210, the color depth and bit separation point for each pixel information to re-configure original pixel information. The re-configured pixel information may be transmitted to the video data output interface 270.

Figure 5:
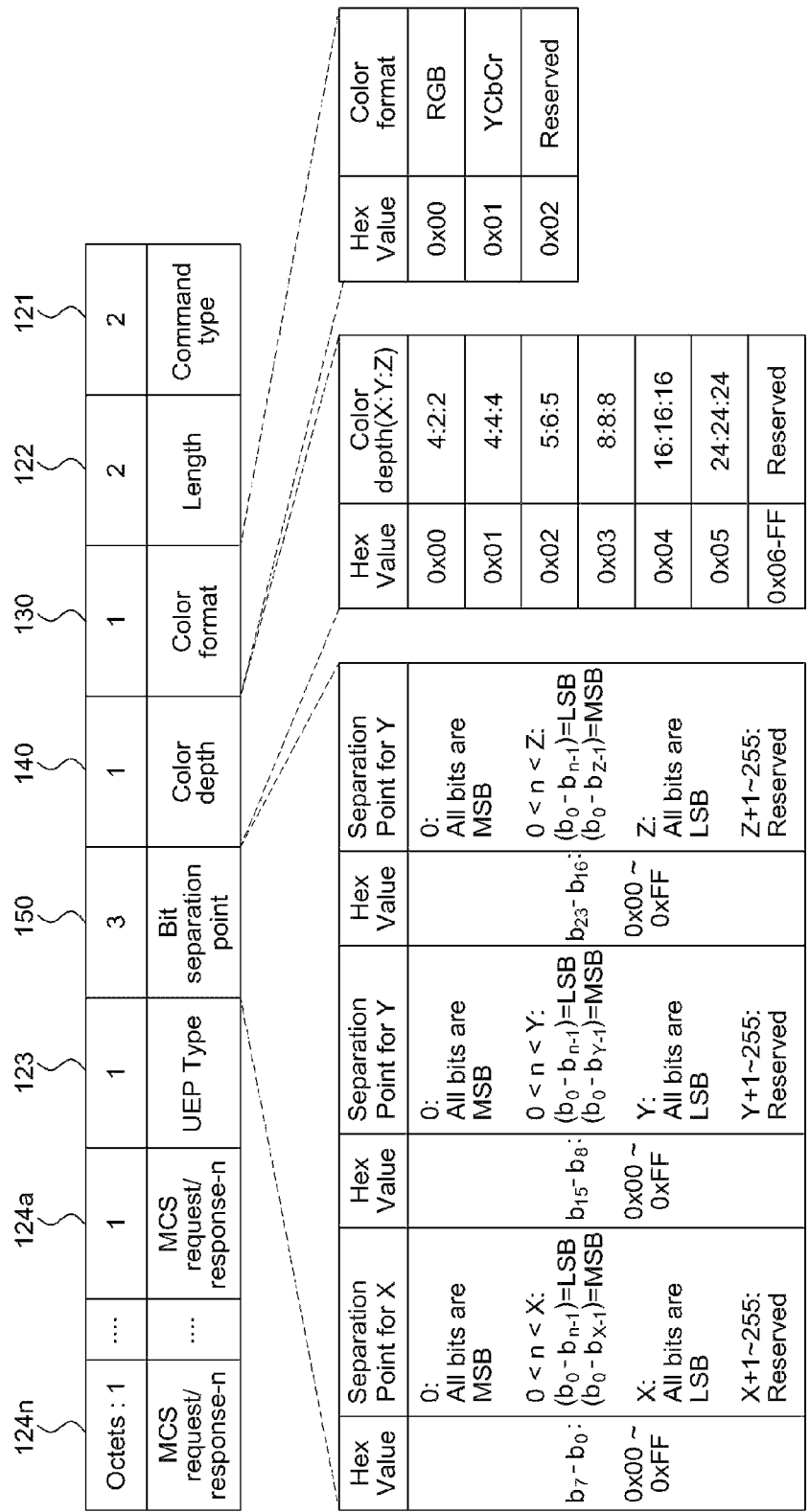
FIG. 5 illustrates a configuration of a UEP negotiation message between a UEP transmission apparatus and a UEP reception apparatus according to example embodiments.

FIG. 5 illustrates a configuration of a UEP negotiation message between a UEP transmission apparatus and a UEP reception apparatus according to example embodiments of the present invention. As illustrated in FIG. 5, information required in the present invention may be supplemented in a conventional UEP negotiation message.

The UEP negotiation request message 120a transmitted from the UEP Tx controller 110 to the UEP Rx controller 210, and the UEP negotiation response message 120b transmitted from the UEP Rx controller 210 to the UEP Tx controller 110 may have an identical structure as illustrated in FIG. 5.

A command type field 121 may be a field indicating the UEP negotiation request message or the UEP negotiation response message. A length field 122 may be a field indicating a length of the UEP negotiation request message or the UEP negotiation response message. A UEP type field 123 may be a field indicating a UEP type separated in a conventional art, and may not be limited as a specific value because the present invention is completely compatible with the conventional art.

MCS fields 124a to 124n may be fields indicating MCS types supported for a UEP stream by the UEP Tx controller 110 and UEP Rx controller 210, and may be displayed as a 6-bit (2 bits not being used) index value. In this instance, specific MCS-related parameters corresponding to the index value may be assumed to be shared between the MCS fields.

According to the present invention, to support various color depths indicating pixel information and support a control of a priority for each pixel information, field information, which will be described below, may be supplemented in a structure of the UEP negotiation message. A color format field 130 describing a color video displaying scheme may be displayed in a 1-byte size, and indicate various color types such as RGB, YCbCr, and the like. Specifically, the color format field 130 may be pixel component information indicating pixel components. A color depth field 140 may indicate a bit-field-size value of three pixel elements.

In FIG. 5, for an illustrative purpose only, 1-byte size may be assigned to the color depth field 140 to display the color depth value of the three pixel elements, however, various methods for displaying the color depth value by assigning the 1-byte size to each of the pixel elements may exist.

A bit separation point field 150 may be supplemented in the structure of the UEP negotiation message, and separate, into bits with a high priority and bits with a low priority, pixel component information being composed of the color depth determined for each pixel element by the color depth field 140.

As an example, as illustrated in FIG. 5, the bit separation point field 150 may be displayed in a 3-byte size (in total, 24 bits of b0 to b23). When each of the color depth values of the three pixel elements in the color depth field 140 are designated as X, Y, and Z, a first byte (b0 to b7) may designate bit point values used when separating pixel elements having a bit field of X into two levels according to a corresponding priority.

A second byte (b8 to b15) may designate bit point values used when separating pixel elements having a bit field of Y into two levels according to a corresponding priority, and a third byte (b16 to b23) may designate bit point values used when separating pixel elements having a bit field of Z into two levels according to a corresponding priority.

Accordingly, when a byte value is designated as '0', all bits of the corresponding pixel elements may be included in a higher priority frame (displayed as a most significant bit (MSB) frame in FIG. 5), and when the byte value is designated as the color depth values (that is, X, Y, and Z), all bits of the corresponding pixel elements may be included in a lower priority frame (displayed as a least significant bit (LSB) frame in FIG. 5).

When the byte value designates an arbitrary n value that is greater than '0' and smaller than the color depth values (that is, X, Y, and Z), all n-bits of 0th bit to a (n−1)-th bit in bits indicating the corresponding pixel elements may be included in the LSB frame, and an n-bit to a (color depth value-1)-th bit may be included in the MSB frame.

As described above, as an example of separately controlling the priority for each pixel element, the bit separation point is designated as 0, 8, and 8, respectively, in a YCbCr system having a color depth value of 8:8:8, whereby all bits used to indicate Y may be included in the MSB frame, and all bits used to indicate the CbCr may be included in the LSB frame. As a result, Y signals that are more sensitive to a sense of sight of a human being may be processed to be immune to channel errors in comparison to CbCr signals that are more insensitive to the sense of sight.

Figure 6:
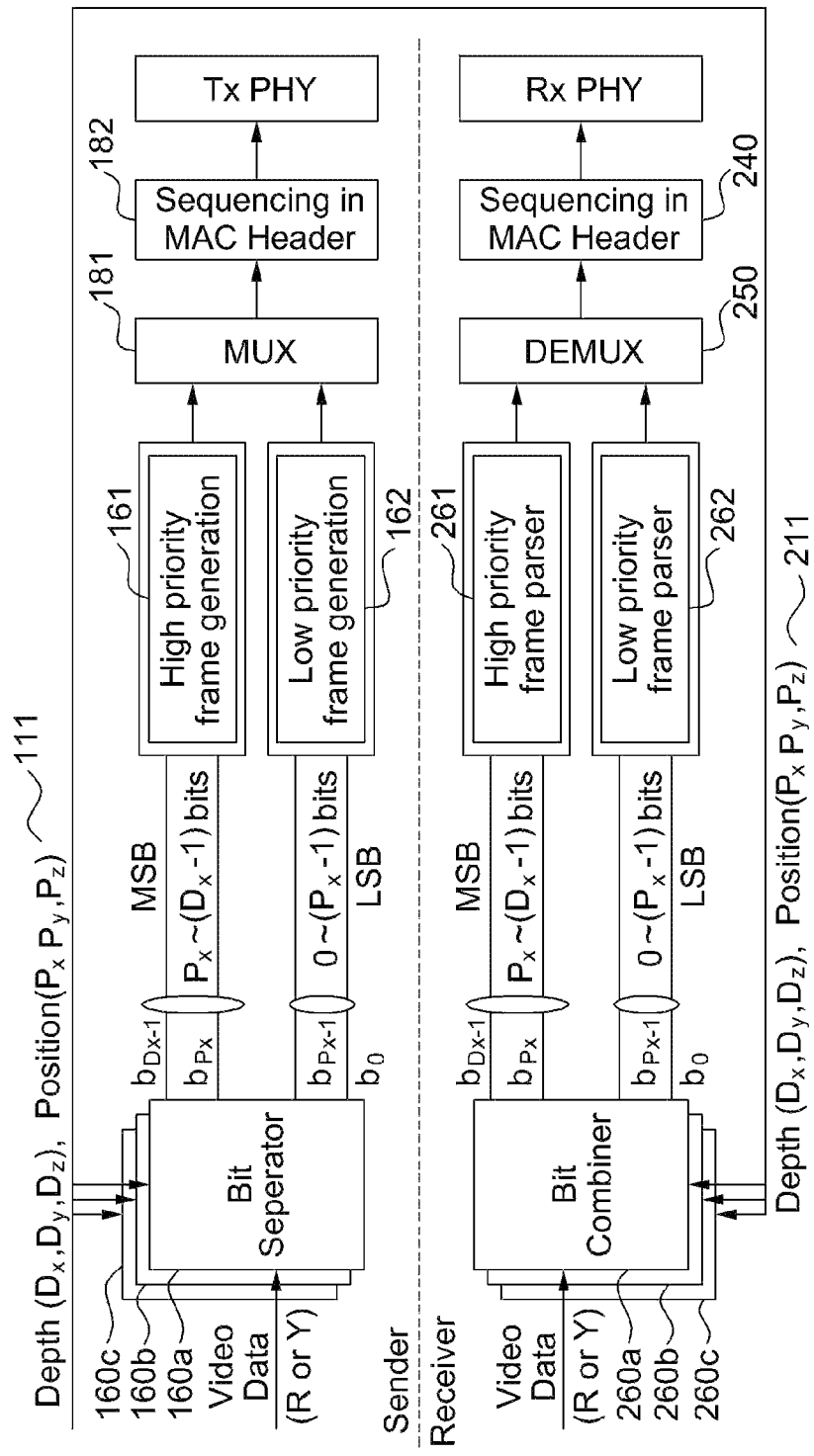
FIG. 6 is a flowchart illustrating a UEP method according to example embodiments.

FIG. 6 is a flowchart illustrating a UEP method according to example embodiments of the present invention. Bit field information (Dx, Dy, and Dz) and bit separation point information (Px, Py, and Pz) for a video pixel element, that are negotiated between the UEP Tx controller 110 and the UEP Rx controller 210 using the UEP negotiation messages 120a and the UEP response message 120b as described in FIG. 5, may be transmitted to the bit separators 160a, 160b, and 160c for each pixel element in a case of the transmission apparatus as shown at 111, and also transmitted to the bit combiners 260a, 260b, and 260c for each pixel element in a case of the reception apparatus as shown at 211.

An example of R or Y pixel elements whose color depth value is Dx, and whose bit separation point value is Px will be herein described in detail. The bit separator 160a of the UEP Tx apparatus 100 may receive, from the video data input interface 101, the R or Y pixel elements in a series of bit types to thereby separate the received pixel elements in a Dx bit unit. Next, the bit separator 160a of the UEP Tx apparatus 100 may enable 0th bit to (Px−1)th bit of the separated Dx bits to be included in the LSB frame 162, that is, the lower priority frame, and also enable Px th bit to (Dx−1)th bit thereof to be included in the MSB frame 161, that is, the higher priority frame.

When frames having a certain size are configured, the MSB frame 161 and the LSB frame 162 may be processed in the procedure as described in FIG. 3, and then the processed frames may be transmitted to the reception apparatus. The UEP Rx controllers 210 may process the received frames in the procedure as described with reference to FIG. 4 to re-configure an MSB frame 261 and LSB frame 262 of R or Y pixel elements, bit information being composed of the MSB frame 261 may be separated in a (Dx-Px) bit unit to be inputted in a bit combiner 260a, and at the same time, bit information being composed of the LSB frame 262 may be separated in a Px bit unit to be inputted in the bit combiner 260a. The bit combiner 260a may combine bits inputted in parallel as described above in a Dx bit unit to re-configure the R or Y pixel elements, and transmit the re-configured R or Y pixel elements to the data output interface 270.

Figure 7:
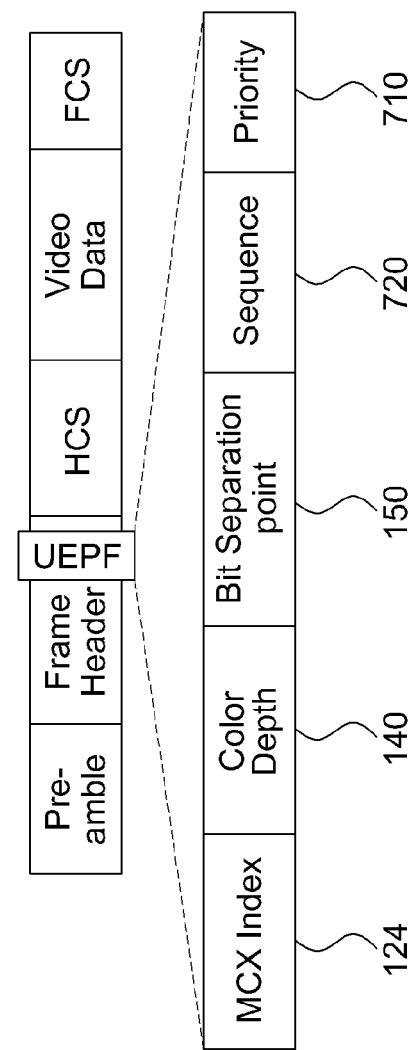
FIG. 7 illustrates a structure of video data on which a UEP is performed according to example embodiments.

FIG. 7 illustrates a structure of video data on which a UEP is performed according to example embodiments of the present invention. In general, UEP information may be transmitted in a frame header type, and include a priority field 710 displaying a priority of transmitted video data, a sequence number field 720 displaying a transmission order, and an MCS field 124 displaying a modulation and a channel coding scheme of video data.

In particular, according to the present example embodiment, other implemented examples of the present invention may be suggested, in which the color depth and bit separation point of the pixel may be transmitted through the UEP negotiation message as described with reference to FIG. 3 to FIG. 5, corresponding information may be transmitted together with video data as described with reference to FIG. 7, and the UEP reception apparatus 200 may restore original pixel information using frame header information.

Figure 8:
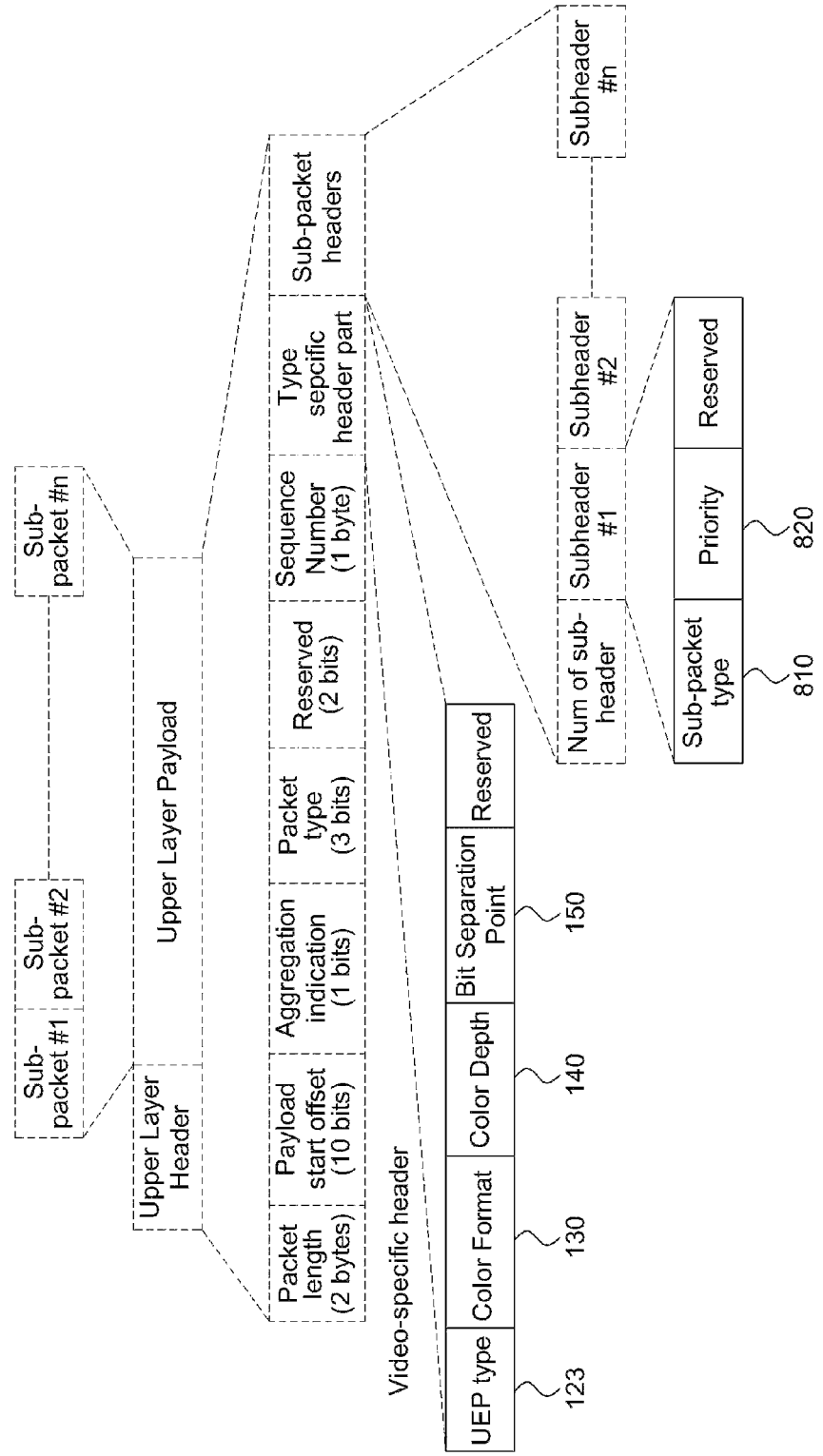
FIG. 8 illustrates a structure of data when generating most significant bit (MSB)/least significant bit (LSB) frames in a Media Access Control (MAC) upper layer of a UEP transmission apparatus.

FIG. 8 illustrates a structure of data when generating MSB/LSB frames in the MAC upper layer of a UEP transmission apparatus. In FIG. 8, the structure of data transmitted from the multiplexing and buffer unit 181 of FIG. 3 to FIG. 6 to the header generation unit 182 is illustrated. When the transmission apparatuses of FIG. 3 to FIG. 6 are hierarchized to be implemented, the multiplexing and buffer unit 181 may be determined as an upper layer, and the header generation unit 182 may be separated as an MAC hierarchy, and thus this will be used as an example embodiment of a data transmission structure between the upper layer and MAC hierarchy.

In FIG. 8, a data structure illustrated with dotted lines may be used in a conventional ECMA TC48 6th Draft for PHY and MAC layers for 60 GHz wireless network, and header portions of video type illustrated with dotted lines may be included in the fields 123, 130, 140, and 150 of FIG. 5.

A field display-bit length of the color format field 130, the color depth field 140, and the bit separation point field 150 may be adjusted, as necessary. The fields 130, 140, and 150 may be applied to all sub-packets included in an identical data structure.

An individual sub-packet may be the configured MSB frame or LSB frame as described with reference to FIG. 6. The individual sub-packet may have a corresponding sub-packet header, and the sub-packet header may display a corresponding sub-packet type field 810 and priority field 820. The sub-packet type field 810 may display which pixel element bit information included in the sub-packet comprises the sub-packet. The priority field 820 may display that bit information is the MSB frame or the LSB frame.

The sub-packet type field 810 may be applied in another case other than the MSB/LSB frame separation method described with reference to FIG. 6. Specifically, each color pixel may be separated into an MSB bit stream and LSB bit stream based on the color depth field 140 and bit separation point field 150 instead of configuring the MSB or LSB frame for each color pixel, and bits with a certain length from the MSB bit stream of three pixels may be multiplexed to configure the multiplexed bits as an MSB frame, and also bits with a certain length from the LSB bit stream of the three pixels may be multiplexed to configure the multiplexed bits as an LSB frame. In this case, the sub-packet type field 810 may display which pixel element bit information included in the sub-packet comprises the sub-packet.

As described above, according to the UEP apparatus and UEP method of the present disclosure, more important pixel information may be more strongly protected, thereby preventing significant deterioration of image quality occurring in transmission channel errors in a reception end. Also, an error control may be focused on more important signal elements, thereby improving a transmission speed.

Although a few example embodiments have been shown and described, the present disclosure is not limited to the described example embodiments. Instead, it would be appreciated by those skilled in the art that changes may be made to these example embodiments without departing from the principles and spirit of the disclosure, the scope of which is defined by the claims and their equivalents.

What is claimed is:

1. An Unequal Error Protection (UEP) method in a transmission apparatus, the UEP method comprising:
    verifying a bit separation point for separating a bit field size responsive to color depth and a color priority for each pixel element being comprised of a pixel of video data in a case in which the video data is received by a video data input interface of the transmission apparatus;
    classifying each pixel of the video data based on the priority for each pixel element; and
    performing an error correction coding for correcting relatively many errors occurring in information responsive to the color priority for each pixel element.

2. The UEP method of claim 1, wherein the verifying transmits/receives a UEP negotiating message including UEP reception apparatus information, pixel component information, bit field size information, and bit separation point information to thereby negotiate the bit field size and bit separation point for each pixel element.

3. The UEP method of claim 1, further comprising:
    separating, for each priority, bits on which the error correction coding is performed based on the priority to generate the bits as a frame, and modulating the frame in a predetermined modulation scheme corresponding to the priority to generate UEP video data.

4. The UEP method of claim 3, wherein the UEP video data includes priority information indicating a priority of the UEP video data, sequence number information indicating a transmission order, modulation and coding scheme (MCS) index information indicating a modulation and channel coding scheme of the video data, pixel component information, and bit field size information.

5. The UEP method of claim 1, further comprising:
    generating, in a Media Access Control (MAC) upper layer, a data frame including bits on which the error correction coding is performed based on the priority.

6. The UEP method of claim 5, wherein
    the data frame includes, in a header of the data frame, a video type header including UEP type information, bit field size information, bit separation point information, and color format information,
    wherein the bit field size information, the bit separation point information, and the color format information are uniformly applied to all sub-packets of the data frame, and
    wherein each of the sub-packets has a sub-packet header including a sub-packet type of information about the pixel component, and the priority, the sub-packet header being included in the header of the data frame.

* * * * *